(12) United States Patent
Zychowski et al.

(10) Patent No.: US 9,481,808 B2
(45) Date of Patent: Nov. 1, 2016

(54) COATING COMPOSITIONS

(71) Applicant: The Sherwin-Williams Company, Cleveland, OH (US)

(72) Inventors: Frank D. Zychowski, Medina, OH (US); Christopher J. Fox, Wellington, OH (US); Madhukar Rao, Twinsburg, OH (US); James K. Marlow, Macedonia, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 331 days.

(21) Appl. No.: 13/840,336

(22) Filed: Mar. 15, 2013

(65) Prior Publication Data
US 2014/0031491 A1 Jan. 30, 2014

Related U.S. Application Data

(60) Provisional application No. 61/676,114, filed on Jul. 26, 2012.

(51) Int. Cl.
| | |
|---|---|
| *C09D 167/00* | (2006.01) |
| *C09D 167/08* | (2006.01) |
| *C08F 290/06* | (2006.01) |
| *C09D 155/00* | (2006.01) |
| *C09D 4/00* | (2006.01) |
| *C08F 283/01* | (2006.01) |
| *C08F 290/14* | (2006.01) |

(52) U.S. Cl.
CPC ........... *C09D 167/00* (2013.01); *C08F 283/01* (2013.01); *C08F 290/061* (2013.01); *C08F 290/141* (2013.01); *C09D 4/00* (2013.01); *C09D 155/005* (2013.01); *C09D 167/08* (2013.01)

(58) Field of Classification Search
CPC ..................................................... C09D 167/00
USPC .................................................. 524/601, 513
See application file for complete search history.

(56) References Cited

U.S. PATENT DOCUMENTS 4,567,099 A * 1/1986 Van Gilder et al. .......... 428/327
7,129,278 B2 * 10/2006 Kayima et al. .............. 521/48.5

* cited by examiner

*Primary Examiner* — Ling Choi
*Assistant Examiner* — Ronald Grinsted
(74) *Attorney, Agent, or Firm* — Peter T. Nguyen; James C. Scott; Vivien Y. Tsang

(57) ABSTRACT

Coating compositions comprising:
(i) a water reducible monomer modified alkyd obtained by the acidolysis of a polyalkylene terephthalate or polyalkylene napthanate and subsequent monomer modification and
(ii) a latex having an average particle size greater than 200 nm and
(iii) a small particle size latex having an average particle size less than 110 nm.

3 Claims, No Drawings

COATING COMPOSITIONS

CROSS REFERENCE TO RELATED APPLICATION

This application claims the benefit of U.S. provisional patent application No. 61/676,114 filed on Jul. 26, 2012, the entirety of which is hereby incorporated by reference.

This invention relates to coating compositions comprising: (i) a water reducible monomer modified alkyd obtained by the acidolysis of a polyalkylene terephthalate or polyalkylene napthanate and subsequent monomer modification and (ii) a latex having an average particle size greater than 200 nm and (iii) a small particle size latex having an average particle size less than 110 nm. As used herein, particle sizes were determined using light scattering. In particular, the particle sizes of the latexes specifically taught herein were measured using a Zetasizer Nano-S dynamic light scattering instrument.

1. Monomer Modified Polyalkylene Terephthalate or Naphthalate Alkyds

One element of this invention relates to an aqueous alkyd dispersion derived from a polyalkylene terephthalate, or polyalkylene naphthalate, as a raw material for producing the resin. The process for making the dispersion includes an acidolysis reaction of a polyalkylene terephthalate or polyalkylene naphthalate and the subsequent monomer modification of the resin followed by combining the modified resin with water in the presence of a base to provide water dispersibility. The production of such alkyds is taught, representatively in U.S. Pat. Nos. 5,371,112 and 7,129,278.

One useful method to produce the polyalkylene terephthalate based alkyd is that taught in U.S. Pat. No. 7,129,278 and involves generally a process for forming a polymer which comprises reacting:
   a. a polymer formed as the reaction product of
      (1) a mixture of compounds resulting from an acidolysis reaction of a polyalkylene terephthalate (or naphthalate) with a member of the group consisting of acid- and anhydride-functional materials; and
      (2) an alcohol, wherein the resulting reaction product of steps (1) and (2) has an acid value of less than 20; and
   b. an ethylenically-unsaturated monomer suitable for modifying the polymer to form a modified polymer resin; wherein the modified polymer resin has an acid value of less than 30, and wherein said modified polymer resin is then combined with water in the presence of a base to form the aqueous polymer composition.

The monomer modified alkyd dispersion of this invention utilizes polyalkylene terephthalate, or polyalkylene naphthalate, as the starting material for the production of the polymer. One useful polyalkylene terephthalate is polyethylene terephthalate (PET). Polyethylene naphthalate (PEN) can also be used. Other polyalkylene terephthalates are polypropylene terephthalate, polybutylene terephthalate, etc.

In the production of the alkyd, a polyalkylene terephthalate resin is first digested into lower molecular weight oligomeric units through an acidolysis reaction. The digestion product of the acidolysis reaction is then further reacted with a hydroxy-functional reactant to produce a resin which is further monomer-modified and dispersed into water. For purposes of this invention, the use of polyethylene terephthalate is described; however, it should be recognized by those skilled in the art that other polyalkylene terephthalates, or polyalkylene naphthalates, can be used similarly.

The actual source of PET usable herein is not of critical importance to this invention. "Virgin" PET, that is PET which is commercially produced specifically as a raw material, is acceptable from a chemical standpoint for use herein. Likewise, recycled or reclaimed PET is acceptable from a chemical standpoint. At the time of this application, there are advantages to the environment (reduction of solid waste) and to the economics of this process (recycled PET is much less expensive than virgin PET) by using recycled or reclaimed PET; and, there are no performance disadvantages to using recycled PET versus virgin PET. Typically, the sources for PET are many and varied. One source of either virgin or recycled PET is material from PET polymer manufacturers. Another source for PET can be post-industrial outlets. A further source is reclaimed PET, such as recycled PET beverage bottles, it should be appreciated that any source of PET is acceptable. Polyethylene naphthalate and polybutylene terephthalate are available similarly.

The PET should generally be provided in a comminuted form. It can be flaked, granulated, ground to a powder or pelletized. The only constraint placed on the PET at this point is that it is relatively pure; that is, there should not be a level of impurities above about one weight percent (1 wt %) nor should there be any appreciable level of impurities which are chemically reactive within this process. Polyols also used in the manufacture of PET include diethylene glycols, triethylene glycols, neopentyl glycol, cyclohexane dimethanol, butanediols, and propanediols are used as polymer modifiers, and are acceptable as used in this invention.

PET is comprised of repeating units of ethylene glycol and terephthalic acid connected by ester linkages. Each repeating unit of PET has a weight average molecular weight of 192 with one equivalent of ethylene glycol and one equivalent of terephthalic acid. By reacting PET with an acid or anhydride functional material in an acidolysis reaction, it is possible to reduce the average chain length of the PET molecules. The chemistry of PET is such that equilibrium exists between PET, water, ethylene glycol (EG), terephthalic acid (TPA), and the acid used to reduce the chain length. This equilibrium makes it possible to substantially reverse the polymerization process and depolymerize PET into its starting materials.

Suitable acid-functional materials for the acidolysis reaction include mono-functional acids such as benzoic, crotonic and sorbic acids; and acids having an acid functionality on average of at least two carboxylic acid groups, such as phthalic acid, isophthalic acid, 1,4-cyclohexane dicarboxylic acid, 1,3-cyclohexane dicarboxylic acid, succinic acid, adipic acid, azelaic acid, maleic acid, fumaric acid, trimellitic acid, trimesic acid, naphthalene dicarboxylic acids, carboxy-terminated polybutadiene, 4,4-dicarboxy diphenoxy ethane, and the hydroxy carboxylic acids of piralactone. Other suitable acids include the saturated acids such as butyric, caproic, caprylic, capric, lauric, myristic, palmitic, stearic, 12-hydroxystearic, arachidic, behenic and lignoceric acids; the unsaturated acids such as palmitoleic, oleic, ricinoleic, linoleic, linolenic, eleostearic, licaric, gadoleic and eracic acids; and the oils (and their fatty acids) such as canola, rapeseed, castor, dehydrated castor, coconut, coffee, corn, cottonseed, fish, lard, linseed, oticica, palm kernel, peanut, perilla, safflower, soya, sunflower, tallow, tung, walnut, vernonia, tall and menhaden oils; and blends and mixtures of natural and synthetic oils and fatty acids, particularly those oils and fatty acids with high iodine numbers.

In order to provide the alkyd with air drying capability it is convenient to utilize the drying oil and semi-drying oil fatty acids as at least some of the acid in the acidolysis reaction thereby imparting drying oil or semi-drying oil functionality to the resin.

Representative anhydrides useful in the acidolysis include, acrylic anhydride, methacrylic anhydride, phthalic anhydride, 3-nitrophthalic anhydride, 4-nitrophthalic anhydride, 3-flourophthalic anhydride, 4-chlorophthalic anhydride, tetrachlorophthalic anhydride, tetrabromophthalic anhydride, tetrahydrophthalic anhydride, hexahydrophthalic anhydride, methylhexahydrophthalic anhydride, succinic anhydride, dodecenylsuccinic anhydride, octylsuccinic anhydride, maleic anhydride, dichloromaleic anhydride, glutaric anhydride, adipic anhydride, chlorendic anhydride, itaconic anhydride, citraconic anhydride, endo-methylenetetrahydrophthalic anhydride, cyclohexane-1,2-dicarboxylic anhydride, 4-cyclohexene-1,2-dicarboxylic anhydride, 4-methyl-4-cyclohexene-1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride, benzophenone tetracarboxylic dianhydride and the like.

Other useful anhydrides include those anhydrides having a free carboxyl group in addition to the anhydride group such as trimellitic anhydride, aconitic anhydride, 2,6,7-naphthalene tricarboxylic anhydride, 1,2,4-butane tricarboxylic anhydride, 1,3,4-cyclopentane tricarboxylic anhydride, and the like.

It should be appreciated that other acids and anhydrides should be considered equivalents of those named herein.

The acid- or anhydride functional material will generally have a number average molecular weight below about 2000. Preferably the acid- or anhydride-functional material will have a number average molecular weight of below about 600. Typical number average molecular weights of these materials will range from about 96 to about 600.

Optionally, a catalyst can be used for the acidolysis reaction. If used, suitable catalysts for acidolysis of PET include the traditional transesterification catalysts including stannous octoate, calcium hydroxide, lithium hydroxide, barium hydroxide, sodium hydroxide, lithium methoxide, manganese acetate tetrahydrate, dibutyl tin oxide, butyl stannoic acid, and hydrated monobutyl tin oxide. If used, the catalyst should be present in an amount of from about 0.1 weight % to about 1.5 weight % based upon the total weight of the PET and acid-functional material.

When PET and an acid- or anhydride-functional material are reacted together in the presence of the catalyst (optional) and heat, the high molecular weight PET molecule is broken down into shorter chain fragments. This is accomplished through acidolysis of the ester linkages and exchange by the acid with the terephthalic acid units of the PET molecule. This exchange continues to occur until a new equilibrium is established between the PET, the shorter chain length PET, the shorter chain length PET substituted with the acid, the acid-functional material and terephthalic acid.

Subsequent to acidolysis, the remaining PET fragments and products in equilibrium therewith are predominantly acid-functional. As described further below, the acidolysis reaction products can be further reacted with hydroxy-functional materials and the like. The reaction can be carried out in the presence of a solvent for azeotroping of water or fusion in solventless systems.

The products of the acidolysis reaction are further reacted with hydroxy-functional materials to produce a polyester product useful in coating compositions. Since the acidolysis reaction products are predominantly acid-functional, they can be further reacted with alcohols including those taught below to obtain polymer compositions useful in coatings. By controlling the amounts and types of reactants, as well as the length and temperature of the reaction, one can formulate low acid value systems from the acidolysis reaction products. The products of such reactions include alkyds and polyesters which can be further modified and dispersed in water.

Generally, the alcohols used for reaction with the acidolysis reaction product will have number average molecular weights of below about 4000, and typically, number average molecular weights will range from about 30 to about 4000, and especially 100 to about 600. Methods of preparing alcohols are well known in the art and the method of preparation of the alcohols is not critical to the practice of this invention.

Suitable alcohols include the C1-C22 linear and branched saturated and unsaturated alcohols including, for example, methanol, ethanol, propanol, butanol, hexanol, linoleyl alcohol, trimethylolpropane diallyl ether, allyl alcohol, 2-mercaptoethanol and the like. Additionally, useful alcohols include the hydroxy-functional polyethers, polyesters, polyurethanes, polycaprolactones, etc.

Saturated and unsaturated polyols include glycerol, castor oil, ethylene glycol, dipropylene glycol, 2,2,4-trimethyl 1,3-pentanediol, neopentyl glycol, 1,2-propanediol, 1,3-propanediol, 1,4-butanediol, 1,3-butanediol, 2,3-butanediol, 1,5-pentanediol, 1,6-hexanediol, 2,2-dimethyl-1,3-propanediol, dimethylol propionic acid, acetylenic diols, hydroxy-terminated polybutadiene, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetra methylene glycol, pentamethylene glycol, hexamethylene glycol, decamethylene glycol, diethylene glycol, triethylene glycol, tetraethylene glycol, 1,4-benzenedimethanol, 1,4-benzenediethanol, 2,4-dimethyl-2-ethylenehexane-1,3-diol, 2-butene-1,4-diol, trimethylolethane, trimethylolpropane, di-trimethylolpropane, trimethylolpropane monoallyl ether, trimethylolhexane, triethylolpropane, 1,2,4-butanetriol, glycerol, pentaerythritol, dimethylolpropane, dipentaerythritol, methyl propanediol, phenolic polyols, polypropylene ether glycols, polyethylene ether glycols etc.

Another useful class of hydroxy-functional materials are polymers such as those prepared by condensation polymerization reaction techniques or ring opening reactions of epoxies as are well known in the art.

As stated above, the acidolysis reaction products can be further reacted with alcohol to produce low acid value products. The term "low acid value products" is meant to be those compositions having acid values lower than about 20. In order to formulate an acidolysis reaction product to a low acid value of less than about 20, the following stoichiometric proportions of materials should be used. For each mole of repeating unit PET used, from about 1.5 to about 4.0 equivalents of acid/anhydride should be used in the acidolysis reaction, followed by further reaction with about 2.0 to about 4.0 equivalents of hydroxy-functionality. Preferably, the equivalents of acid/anhydride to repeating unit of PET should be about 2.0:1 to about 3.1:1 and the equivalents of OH to PET should be about 2.3:1 to about 3.7:1. Optionally, small amounts of amine or diamine can be substituted for some of the alcohols.

The initial acidolysis produced resin is then directly modified with unsaturated monomers, to produce the monomer modified water-reducible polymers utilized in this invention.

Direct monomer modification is typically conducted under conditions also well known in the art, including the procedures taught in U.S. Pat. Nos. 4,735,995 and 4,873,281, as well as by the procedures taught in the Examples below.

When monomerically modifying the base polymers, the incorporation of a sufficient amount of acid-functional monomer material, with or without surfactants, will enable the final polymer products to be reducible in water or other aqueous systems when sufficiently neutralized as discussed below.

Surfactants that can optionally be used for this invention include nonionic surfactants such as, but not limited to, nonylphenol ethoxylates (such as IGEPAL® CO-Series available from Rhodia, Cranberry, N.J.), octylphenol ethoxylates (such as IGEPAL® CA-Series available from Rhodia, Cranberry, N.J.), polyether polyols (such as PLURONIC® or TETRONIC® available from BASF Corporation, Mt. Olive, N.J.), and acetylenic alcohols (such as SURFYNOL® available from Air Products, Allentown, Pa.). The surfactant, if present, is preferably about 1% to about 5% of the total weight of the polymer.

Generally, amounts of acid-functional monomer materials greater than about 5.0% by weight of the total amount of monomer and other ethylenically unsaturated materials will result in a coating composition which is water reducible. Amounts less than the above will generally result in coatings which are not water reducible. Preferably, the monomer-modified base polymer of this invention has low volatile organic levels. More preferably, the volatile organic level of the monomer-modified base polymer is less than 10%.

Suitable monomers for modifying the base polymer include the unsaturated acids, such as acrylic acid, methacrylic acid, itaconic acid, crotonic acid, maleic acid, and half esters of maleic and fumaric acids, such as butyl hydrogen maleate and ethyl hydrogen fumarate, in which one carboxyl group is esterified with an alcohol. Examples of other ethylenically unsaturated monomers which can be used for the monomer modification of the acidolysis reaction product include the alkyl acrylates, such as methyl acrylate, ethyl acrylate, butyl acrylate, propyl acrylate, 2-ethylhexyl acrylate and isobornyl acrylate; the alkyl methacrylates, such as methyl methacrylate, butyl methacrylate, 2-ethylhexyl methacrylate, decyl methacrylate, lauryl methacrylate, acetoacetoxyethyl methacrylate, dimethylaminoethyl methacrylate, and allyl methacrylates and isobornyl methacrylate; hydroxyalkyl acrylates and methacrylates such as hydroxyethyl acrylate, hydroxypropyl acrylate, hydroxyethyl methacrylate, hydroxypropyl methacrylate; acrylamides and methacrylamides, diacetone acrylamide, and unsaturated nitriles such as acrylonitrile, methacrylonitrile, and ethacrylonitrile. Other ethylenically unsaturated monomers (vinyl monomers) which can be used in addition to the acrylic monomers include: vinyl aromatic hydrocarbons (such as styrene, alpha-methyl styrene, and vinyl toluene); and vinyl aliphatic hydrocarbons (optionally substituted, for example, by halogen atoms) such as vinyl acetate, vinyl versatates, and vinyl chloride.

The monomer modification of the acidolysis reaction product generally can be conducted at from 80° C. to 160° C., and typically are conducted at from 100° C. to 150° C.

A polymerization initiator can be employed in the monomer modification stage. Examples of initiators include, but are not limited to: peroxyesters such as tertiary-butyl perbenzoate; azo compounds such as azobis(isobutyronitrile); peroxides such as benzoyl peroxide and cumene hydroperoxide; peracetates such as tertiary butyl peracetate; percarbonates such as isopropyl percarbonate, peroxycarbonates such as butyl isopropyl peroxycarbonate, and similar compounds. The quantity of initiator employed can be varied considerably; however, in most instances, it is desirable to utilize from about 0.1 to about 10 percent by weight based on the weight of ethylenically unsaturated monomers used. Where desired, a chain modifying agent or chain transfer agent can be added to the polymerization mixture for control of the molecular weight of the resulting resin. Examples of such agents include the mercaptans, such as tertiary dodecyl mercaptan, dodecyl mercaptan, octyl mercaptan, and hexyl mercaptan, etc.

The monomer modification reactions for preparing a resin composition of the invention can be carried out in the presence of an organic solvent, preferably only a limited amount of organic solvent being used so as to minimize the organic solvent content of the resulting product. In one method of preparing the monomer modified resin of this invention, the base polymer serves as a polymerization medium for preparation of the modified polymer thereby significantly reducing the amount of organic solvent needed. The amount of monomeric materials used for modification is in the range of about 10% to about 80%, and more preferably, about 20% to about 60% based on total modified resin solids. For many applications, the modified polymer will have an acid value of less than 30.

The monomer modified acid functional alkyd can be dispersed in water by admixing it with water in the presence of a suitable base. In one process, the monomer modified alkyd resin is initially liquefied by heating the resin to at least its melting point, and more preferably, to a temperature of at least 5° above its melting point so the polymer maintains a molten and flowable state, but below the decomposition temperature of the polymer. Typically, the modified polymer resin will melt in the temperature range from about 120° C. to about 140° C. A separate vessel of water, containing a base for neutralization of the carboxylic acids on the polymer, is heated to between 20° C. and 70° C. The base can be an amine compound or an alkali hydroxide. Water solubility or water dilutability may be given to the resin by effecting neutralization of acidic groups, such as carboxyl, with a basic material, such as monomethylamine, dimethyl amine, trimethylamine, monoethylamine, triethylamine, monoisopropylamine, diisopropylamine, diethylene triamine, triethylenetetramine, monoethanolamine, diethanolamine, triethanolamine, monoisopropanolamine, diisopropanolamine, dimethylethanolamine, morpholine, methyl morpholine, piperazine, ammonia, sodium hydroxide, potassium hydroxide and the like, with or without surfactants. Typically enough base is added to neutralize some of the acid on the polymer. The water phase and the polymer phase are brought into contact with one another and, if desired, can be dispersed in a high shear mill or a homogenizer. The process can be continuous or in batch mode where the tank or mixing vessel contains the water phase. Once the polymer is dispersed in water, the pH is typically adjusted to 7.6-8.2 and the percent solids are adjusted to 35-55% by weight. Preferably, the resulting polymer dispersion has a volatile organic level of less than 10% and an acid number of less than 30.

Coating compositions are prepared by admixing the monomer modified alkyd with an acrylic latex having an average particle size of at least 200 nm and also in combination with a small particle size acrylic latex having an average particle size less than about 110 nm. This combination of different particle size latexes and the monomer modified alkyd provides coatings having unique properties.

In general, the alkyd acts as a coalescent for the latex polymers thereby reducing the need for conventional coalescents and lowering the overall VOC (Volatile Organic Compound) levels of the final coating. The alkyd is also environmentally favorable in that it utilizes recycled plastics and bio-produced oils, such as soya oil. The alkyd also provides favorable application characteristics to the coating when it is applied using typical application methods. The small particle size latex provides increased hardness and reduced dirt pick up in the final film. The larger particle size latex enhances the speed of drying of the final coating.

2. Latex Compositions

The latex polymers used as crosslinkable binder resins in accordance with the present invention include those polymers polymerized from one or more suitable monomers. Typically, the binders are polymerized from one or more copolymerizable monoethylenically unsaturated monomers such as, for example, vinyl monomers and/or acrylic monomers.

The vinyl monomers suitable for use in preparing the latex resins of the present invention include any compounds having vinyl functionality, i.e., ethylenic unsaturation, exclusive of compounds having acrylic functionality, e.g., acrylic acid, methacrylic acid, esters of such acids, acrylonitrile and acrylamides. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl propionate, vinyl laurate, vinyl pivalate, vinyl nonanoate, vinyl decanoate, vinyl neodecanoate, vinyl butyrates, vinyl benzoates, vinyl isopropyl acetates and similar vinyl esters; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

The acrylic monomers suitable for use in accordance with the latex resins of the present invention comprise any compounds having acrylic functionality. Preferred acrylic monomers are selected from the group consisting of alkyl acrylates, alkyl methacrylates, acrylate acids and methacrylate acids as well as aromatic derivatives of acrylic and methacrylic acid, acrylamides and acrylonitrile. Typically, the alkyl acrylate and methacrylic monomers (also referred to herein as "alkyl esters of acrylic or methacrylic acid") will have an alkyl ester portion containing from 1 to about 18, preferably about 1 to 8, carbon atoms per molecule.

Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, and 1-adamantyl methacrylate. If acid functionality is desired, acids such as acrylic acid or methacrylic acid can also be used.

In addition to the specific monomers described above, those skilled in the art will recognize that other monomers such as, for example, allylic monomers, or monomers which impart wet adhesion, such as monomers having tertiary amine, ethylene ureide, or N-heterocyclic groups, can be used in place of, or in addition to, the specifically described monomers in the preparation of the binders. Representative wet adhesion promoting monomers include methacrylamidoethyl ethylene urea, dimethylaminoethyl methacrylate, vinyl imidizole and 2-ethyleneuriedo-ethyl methacrylate. The amount of such other monomers is dependent on the particular monomers and their intended function, which amount can be determined by those skilled in the art.

In one embodiment of the present invention the binder resin may comprise a "single stage" polymer which is typically obtained by admixing selected polymerizable monomers in a single reaction mixture. In another useful embodiment, the binder resin may be obtained by admixing the monomers in multiple stages having different monomer compositions or concentrations at various stages of the addition. For example, the monomer mixture could be varied as the reaction progresses to provide a sequentially formed composition, whereby essentially one polymer is prepared in the presence of another, preformed polymer. Without being limited to any particular theory, this polymerization process possibly, but not necessarily, results in a core/shell particle arrangement. For some applications, the monomer mix will be varied to provide one sequence of the reaction with a higher concentration of "softer" monomers (those whose homopolymers have relatively lower glass transition temperatures (Tg) and another sequence might involve a greater concentration of "harder" monomers. In embodiments where the binder resin comprises a sequentially formed polymer composition, the lower Tg polymer (the "softer" polymer) may be the core in a core/shell particle arrangement while the higher Tg material (the "harder" polymer) comprises the shell. An opposite arrangement may also be used in connection with the present invention. As used herein "two-stage" polymer refers to an overall polymer where one polymer is essentially formed in the presence of another, preformed polymer.

Preparation of latex compositions is well known in the paint and coatings art. Any of the well-known free-radical emulsion polymerization techniques used to formulate latex polymers can be used in the present invention. Such procedures include, for example, single feed, core-shell, and inverted core-shell procedures which produce homogeneous or structured particles. For some applications it is useful to utilize latex resins which do not contain any self-crosslinking or oxidation curing functionality.

Processing of the latexes to prepare a small particle size or large particle latex can be controlled by methods well known in the art. Typically smaller particle size latexes are prepared by using relatively greater levels of surfactant, especially early in the polymerization process to obtain smaller micelles. The surfactant level may often be in the range of at least about 3% and often within a range of about 3% to about 7%, and for some applications around 5%, of the weight of the monomers to prepare a small particle size latex. The surfactant level may often be in the range of 0.5 to about 2.5, and often around about 1%, of the total weight of the monomers to prepare a larger particle size latex. For many applications of this invention, the small particle latex will have an average particle size in the range of about 70 to about 110 nm. For many applications, the larger particle size latex will have an average particle size in the range of about 220 to about 320 nm.

The ratio of the polymers of the present invention to the latexes in a coating composition covers a wide range depending on the desired properties of the final coating product and intended uses. For many applications, the final composition will include about 1.0 to about 30% of the monomer modified alkyd; about 5 to about 20% of the small particle size latex; and about 60 to about 85% of the larger particle size latex by weight, based upon the total weight solids of each of the latexes and the monomer modified alkyd.

The coatings of this invention can be cured oxidatively, typically in the presence of metal driers, through the drying oil or semi-drying oil functionality, and the latex resins will coalesce as the film dries.

The coatings of this invention can be clear coatings or they may contain pigments or dyes as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, barium sulfate, talc, etc.

The coatings may also contain other additives such as flow agents, catalysts, diluents, solvents, ultraviolet light absorbers and stabilizers, flexibilizers, adhesion promoters, etc.

The coatings of the invention may typically be applied to any substrate such as concrete, asphalt, metal, plastic, wood, grass, synthetic fibers, etc, by brushing, dipping, roll coating, squeegee, flow coating, spraying, in-mold coating, or other method conventionally employed in the coating industry.

The following examples have been selected to illustrate specific embodiments and practices of advantage to a more complete understanding of the invention. Unless otherwise stated, "parts" means parts-by-weight and "percent" is percent-by-weight.

EXAMPLE I

Initial PET Alkyd

An initial PET based alkyd was prepared by charging a reaction vessel with the following:

| | |
|---|---|
| 194.85 parts | soya fatty acids (Industrene 225 from BASF Corp.) |
| 0.38 parts | dibutyltin oxide |
| 96.00 parts | polyethylene terephthalate | and heated to about 500° F. (260° C.) until all of the PET was melted. The mixture was allowed to cool to about 360° F. (182° C.) and the following materials were added:

| | |
|---|---|
| 30.80 parts | isophthalic acid |
| 45.57 parts | trimethylol ethane |
| 8.00 parts | methyl propyl ketone |

The reaction mixture was heated to about 380° F. (193° C.) until most of the water was removed and then gradually heated to about 460° F. (238° C.) and held at that temperature until an acid value of 7.0 was reached and the mixture allowed to cool.

EXAMPLE II

Acrylic Modified PET Alkyd

A water reducible acrylic modified PET alkyd was prepared by charging a reactor with the following:

| | |
|---|---|
| 78.41 parts | PET alkyd of Example 1 |
| 3.92 parts | alkali refined soybean oil | which was heated about 245° F. (118° C.) followed by the addition of:

| | |
|---|---|
| 0.37 parts | dimethylbenzylamine |
| 0.60 parts | methacrylic anhydride |
| 10.87 parts | n-butyl acetate |
| 1.74 parts | methyl propyl ketone | and heated to 280° F. (138° C.) and held for 30 minutes. A monomer mixture comprising:

| | |
|---|---|
| 4.74 parts | acrylic acid |
| 54.02 parts | methyl methacrylate |
| 17.65 parts | 2-ethyl hexyl acrylate | and an initiator mix of:

| | |
|---|---|
| 0.90 parts | t-butyl perbenzoate |
| 2.32 parts | n-butyl acetate | were added simultaneously to the reaction vessel over a 3 hour period and then held for 30 minutes followed by the addition, over a 2 hour period, of a chase initiator mix of:

| | |
|---|---|
| 0.9 parts | t-butyl perbenzoate |
| 2.52 parts | n-butyl acetate |
| 0.49 parts | cumene hydroperoxide |
| 0.49 parts | t-butyl hydroperoxide |

The reaction mixture was held for an additional 30 minutes and then dispersed by addition of the reaction mixture into:

| | |
|---|---|
| 205.16 parts | deionized water |
| 4.40 parts | dimethylethanolamine |
| 0.71 parts | defoamer |
| 0.48 parts | isoascorbic acid | to produce a final monomer modified PET alkyd dispersion with an acid value of 27.4.

EXAMPLE III

A water reducible acrylic was prepared by the following process:

a monomer mixture of:

| | | |
|---|---|---|
| 81.72 | parts | deionized water |
| 2.30 | parts | anionic surfactant |
| 1.53 | parts | aqueous ammonia |
| 0.76 | parts | sodium carbonate |
| 6.14 | parts | sodium vinyl sulfonate 25% |
| 90.27 | parts | styrene |
| 103.17 | parts | butyl acrylate |
| 32.24 | parts | 2-ethyl hexyl acrylate |
| 90.28 | parts | methyl methacrylate |
| 4.91 | parts | methacrylic acid | was separately prepared.

About 10.50 parts of the monomer mixture and an initiator premix of 0.74 parts deionized water and 0.08 parts of ammonium persulfate were added to a reaction vessel containing 126.00 parts deionized water, 0.18 parts sodium carbonate, and 0.46 parts anionic surfactant which had been preheated to 185° F. (85° C.). This was held at that temperature for 15 minutes.

A separate initiator mixture of 14.36 parts deionized water and 0.76 parts ammonium persulfate was prepared.

About 275.7 parts of the monomer mixture and the initiator mixture were then added over a 140 minute period after which the reaction was held for 30 minutes, followed by the addition of 0.92 parts trimethylol propane triacrylate and 4.61 parts deionized water into the remaining 127.12 parts of the monomer premix. That new monomer premix and an additional initiator charge of 8.98 parts deionized water and 0.47 parts ammonium persulfate were then simultaneously added to the reaction mixture over a period of 70 minutes for the monomer mixture and 85 minutes for the initiator. The reaction was then held at 185° F. (70° C.). A chase oxidizer of 5.99 parts water, and 0.46 parts 70% t-butyl hydroperoxide, was added and held for 30 minutes and the batch cooled to 104° F. (40° C.). A chase reducer of 3.83 parts aqueous ammonia, 0.24 parts defoamer, 1.84 parts of a preservative and 4.44 parts deionized water was then gradually added and held for 30 minutes.

EXAMPLE IV

A small particle size water reducible acrylic latex was prepared by the following process:

a monomer mixture of:

| | | |
|---|---|---|
| 0.27 | parts | deionized water |
| 0.014 | parts | n-dodecylmercaptan |
| 0.63 | parts | methacrylic acid |
| 17.02 | parts | butyl acrylate |
| 37.60 | parts | methyl methacrylate | and an initiator mix of

| | | |
|---|---|---|
| 3.29 | parts | deionized water |
| 0.20 | parts | 70% t-butyl hydroperoxide |
| 0.25 | parts | 28% aqueous ammonia | and a reducer mixture of:

| | | |
|---|---|---|
| 3.84 | parts | deionized water |
| 2.55 | parts | Sipomer WAM ® |
| 0.21 | parts | sodium metabisulfite | were separately prepared.

The monomer mixture and the initiator mixture and the reducer mixture were gradually added over a three hour period to a reaction vessel containing 55.26 parts deionized water, 11.18 parts anionic surfactant (Abex® VA-50 from Rhodia), 0.014 parts of potassium persulfate, and 0.24 parts sodium bicarbonate all of which had been preheated to 158° F. (70° C.). After the addition was completed, the reaction mixture was then held at that temperature for an additional 30 minutes.

A chase oxidizer of 2.06 parts deionized water and 0.027 parts 70% t-butyl hydroperoxide and a chase reducer mixture of 2.06 parts deionized water, and 0.09 parts of a reducing agent (Bruggolite® FF6 from Bruggemann Chemical) were then gradually added to the reaction mixture over a one hour period and the reaction mixture was held at 158° F. (70° C.) for an additional 30 minutes.

The reaction mixture was then allowed to cool to a temperature of 113° F. (45° C.) and was adjusted with the addition of 0.24 parts 28% aqueous ammonia, 0.28 parts of a biocide (Proxcel® GXL from Lonza), 2.53 parts deionized water, 0.14 parts of a preservative (Proxcel® BZ from Lonza) and 0.14 parts of a microbicide (Kathlon® LX 1.5 from Dow Chemical) to produce a small particle size latex.

EXAMPLE V

A coating formulation was prepared by admixing:

| | | |
|---|---|---|
| 32.87 | parts | latex of Example III |
| 11.02 | parts | acrylic alkyd of Example II |
| 5.01 | parts | small particle size latex of Example IV |
| 1.00 | parts | deionized water |
| 0.02 | parts | defoamer |
| 0.96 | parts | dispersant |
| 0.02 | parts | biocide |
| 0.28 | parts | nonylphenol ethoxylate nonionic surfactant |
| 10.02 | parts | titanium dioxide |
| 1.00 | parts | deionized water |
| 50.01 | parts | calcite |
| 20.04 | parts | silica |
| 1.80 | parts | water |
| 2.60 | parts | propylene glycol n-propyl ether |
| 0.06 | parts | hydroxy ethyl cellulose |
| 0.26 | parts | defoamer |
| 0.20 | parts | aqueous ammonia |

While this invention has been described by a specific number of embodiments, other variations and modifications may be made without departing from the spirit and scope of the invention as set forth in the appended claims.

The entire disclosure of all applications, patents and publications cited herein are hereby incorporated by reference.

The invention claimed is:
1. A. coating composition comprising:
(i) a water reducible monomer modified alkyd obtained by the acidolysis of a polyalkylene terephthalate or polyalkylene naphthalate and subsequent monomer modification to produce a polymer having an acid value of from about 0.01 to about 30;

(ii) a latex having an average particle size of about 200 nm to about 320 nm, wherein the latex comprises either (a) a single stage polymer that does not have a core/shell particle arrangement, (b) a core/shell particle arrangement wherein a relatively lower Tg polymer comprises the core and a relatively higher Tg material comprises the shell, or (c) a combination thereof; and (iii) a small particle size latex having an average particle size of about 70 to about 110 nm;

wherein;

the alkyd (i) is present at a level of about 10 to about 30%;

the latex (ii) is present at a level of about 60 to about 85%; and the latex(iii) is present at a level of about 5 to about 20%, on a weight solids basis based upon the total weight solids of (i) plus (ii) plus (iii).

2. The coating composition of claim 1 wherein the polyalkylene terephthalate is polyethylene terephthalate.

3. The coating of claim 1 wherein the alkyd has drying oil or semi-drying oil functionality.

\* \* \* \* \*